April 1, 1969 J. A. MARTINSON 3,436,044
STRAINER SUPPORT
Filed Oct. 31, 1966
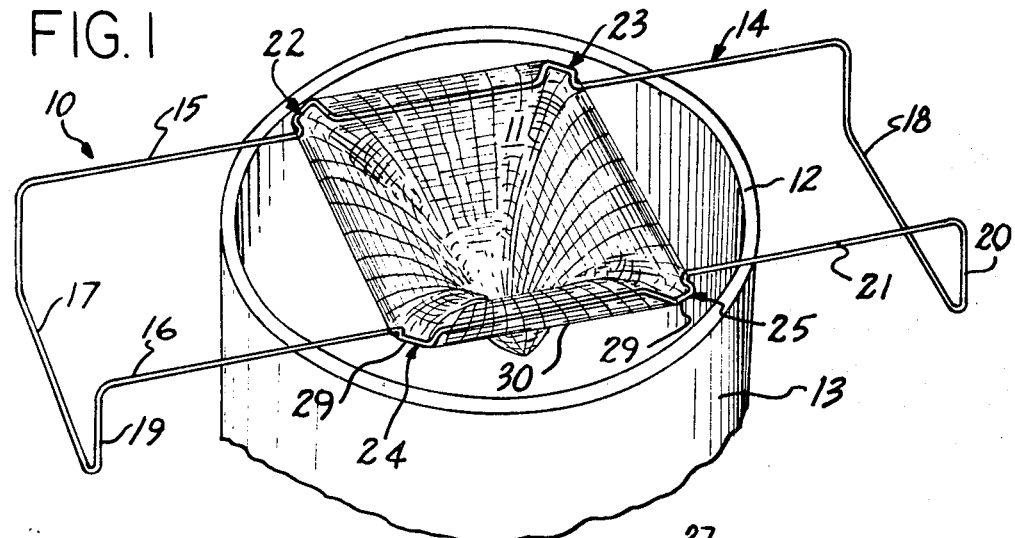
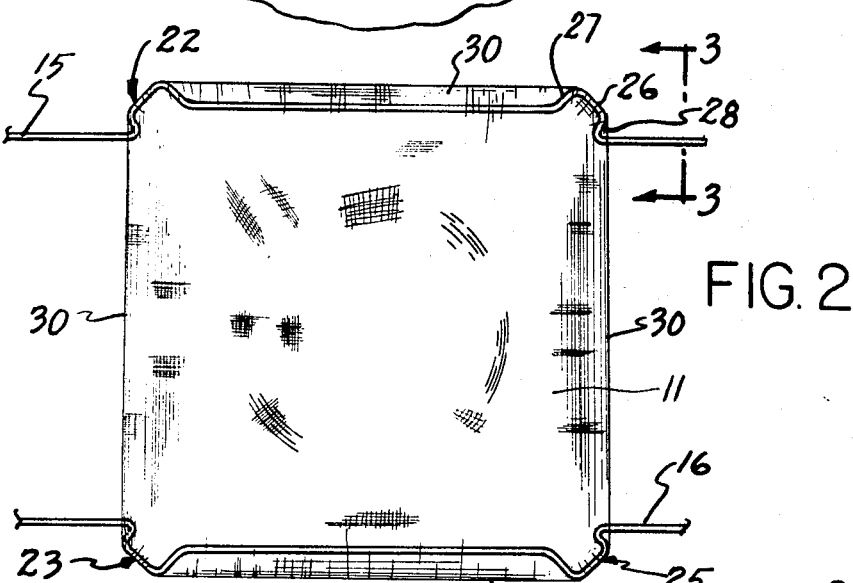
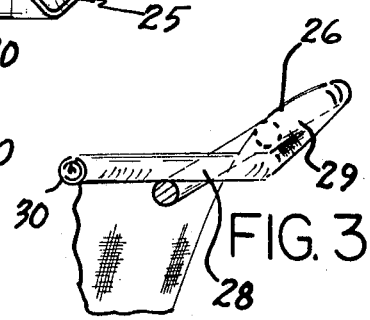
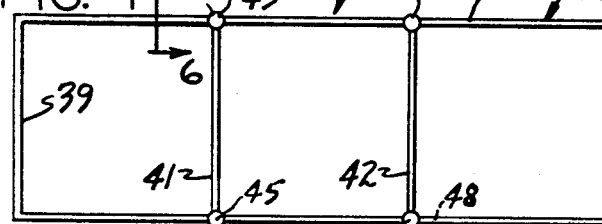
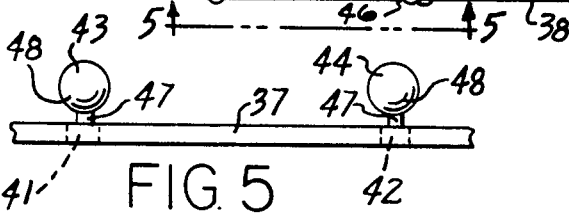

United States Patent Office 3,436,044
Patented Apr. 1, 1969

3,436,044
STRAINER SUPPORT
Jerry A. Martinson, P.O. Box 766,
Williston, N. Dak. 58801
Filed Oct. 31, 1966, Ser. No. 590,602
Int. Cl. B01d 23/28
U.S. Cl. 248—94                                 3 Claims

ABSTRACT OF THE DISCLOSURE

A strainer support for a strainer composed of stretchable material. The support has a rectangular frame with four blunt projections with outwardly and downwardly extending faces. The strainer has a rolled end which is stretched about the projections.

---

This invention relates to a strainer support for strainer material.

It is the primary purpose of the invention to provide a low-cost one-piece strainer support which is especially adapted to utilize a strainer made from a lady's stocking. The rolled edge of the strainer is stretched over blunt projections constructed and arranged to hold the open end of the strainer in the open position; when the strainer has served its function, it is removed from the projections by stretching its rolled edge and the strainer can be easily removed from the strainer support. The blunt projections which are formed integrally with the remainder of the strainer support present a plurality of outwardly and downwardly extending faces which hold the strainer in position.

*Brief summary of invention*

The invention comprises a strainer device with a one-piece elongated frame capable of resting on the upper edge of a receptacle, at least three spaced-apart projections formed integrally with the frame and each having blunt ends and outer surfaces facing downwardly and outwardly, a strainer including stretchable material having a rolled end, with the projections being arranged to enable a rolled end of the strainer material to be stretched over the projections so that the strainer is held by said support frame.

In the drawings:

FIGURE 1 is a perspective view of a strainer support together with strainer material, resting on the open upper end of a receptacle;

FIGURE 2 is a top plan view of a strainer and a fragmentary portion of the strainer support shown in FIGURE 1;

FIGURE 3 is a sectional view taken along line 3—3 of FIGURE 2;

FIGURE 4 is a top plan view of an alternative form of strainer support, the strainer material being omitted;

FIGURE 5 is a side view taken along line 5—5 of FIGURE 4; and

FIGURE 6 is a sectional view taken along line 6—6 of FIGURE 4.

Referring to FIGURE 1 of the drawing, there is shown a strainer support generally indicated at 10, together with strainer material 11, resting on the open upper edge 12 of a receptacle 13.

The strainer support 10 includes a generally rectangular frame 14 having sides in the form of side portions or members 15 and 16 and ends in the form of laterally extending end portions or members 17 and 18. The frame includes leg members 19 and 20. The frame 14 is shown to be composed, in the embodiment of FIGURES 1, 2 and 3, of a single piece of bendable wire, composed for example of mild steel, of 6-gauge size, joined at its ends, as by a weldment 21.

Side member 15 has two spaced apart projections 22 and 23, and the side member 16 has two spaced apart projections 24 and 25 which are laterally opposite the respective projections 22 and 23. Each projection 22 through 25 has a blunt end 26 and outer surfaces shown extending upwardly and outwardly. The projections 22 through 25 are generally inverted U-shaped in construction and include a pair of upwardly and outwardly extending sections 27 and 28. Each projection 22 through 25 has a downwardly and outwardly extending face 29. The continuous rolled edge 30 of the stocking material of which the strainer 11 is preferably composed can be snapped over the projections 22 through 25 because of the resilience of such material. The stocking material can be the foot or leg portion of a ladies' stocking. Stockings which are no longer usable as such might be used as the strainer material with the present invention. The projections 22 and 25, and 23 and 24, extend in opposite outward directions. The four portions of the frame which rest against the upper end 12 of the receptacle 13 are: the portion between projection 22 and end member 17, the portion between projection 24 and end member 17, the portion between the projection 23 and end member 18, and the portion between the projection 25 and end member 18. The strainer material 11 is held in place by the projections 22, 23, 24 and 25 because the rolled edge 30 has a perimeter in its unstretched state which is less than the distance around the space bounded by the projections 22, 23, 24 and 25.

Referring to FIGURES 4, 5 and 6, there is shown an alternative embodiment of the invention, in the form of a strainer support 35 having a frame 36. The frame 36 has side members 37 and 38 and end members 39 and 40. Transverse braces 41 and 42 span the distance between the side members 37 and 38 inwardly of the end members 39 and 40. Blunt projections or balls 43, 44, 45 and 46 are shown to be spherical in shape and are joined to the side members 37 and 38, respectively, by shank portions 47. The projections 43 through 46 have downwardly and outwardly facing surfaces 48. The strainer material used with the embodiment of FIGURES 4, 5 and 6 is preferably the same as is used in the embodiment of FIGURES 1, 2 and 3. The rolled edge 30 can be stretched about the projections 43 through 46 and the downwardly and outwardly facing surfaces 48 hold the strainer material in place. The one-piece strainer support 35 can be molded of plastic material such as polyethylene.

I claim:

1. A strainer comprising: an elongated frame capable of resting on the upper edge of a receptacle, at least three spaced-apart projections formed integrally with said frame and each having blunt ends and surfaces facing outwardly and downwardly, stretchable mesh strainer material having a rolled edge, said rolled edge of said strainer material being stretched over said projections so that said strainer material is held by said projections, said frame and projections being composed of one piece of material, braces spanning the sides of said frame inwardly from the ends of said frame, said projections comprising balls having depending shank portions secured to said frame.

2. A strainer comprising: a substantially rectangular frame having two elongated side members joined at their ends to laterally extending end members, each side member having two spaced-apart projections, said two projections on one side member being laterally opposite said two projections on said other side member, said projections on each side member being spaced inwardly from said end members to enable the four portions of said side members between said projections and their respective end members to rest on the open upper end of a receptacle, each projection having a ball integral with its related side portion, said ball of each projection having a downwardly and outwardly facing outer surface; and stretchable, mesh, strainer material having a rolled edge, said rolled edge having a perimeter in its unstretched state which is less than the distance around the space bounded by said four balls to enable the portion of the mesh material which forms the rolled edge to be manually stretched about said four balls so that the strainer material is held in place by said four balls.

3. A strainer comprising: a substantially rectangular frame having two elongated side members joined at their ends to laterally extending end members, each side member having two spaced-apart projections, said two projections on one side member being laterally opposite said two projections on said other side member, said projections on each side member being spaced inwardly from said end members to enable the four portions of said side members between said projections and their respective end members to rest on the upper end of a receptacle, each projection having an inverted generally U-shaped portion integral with the remainder of its related side portion, said inverted U-shaped portion of each projection having a downwardly and outwardly facing outer surface; and stretchable, mesh, strainer material having a rolled edge, said rolled edge having a perimeter in its unstretched state which is less than the distance around the space bounded by said four inverted U-shaped portions to enable the portion of the mesh material which forms the rolled edge to be manually stretched about the four inverted U-shaped portions to that the strainer material is held in place by said four inverted U-shaped projections.

References Cited

UNITED STATES PATENTS

| 1,265,996 | 5/1918 | Cerny | 248—99 |
| 1,509,961 | 9/1924 | Long | 248—94 X |
| 1,615,542 | 1/1927 | Gros | 248—94 |
| 1,874,411 | 8/1932 | Andrews | 248—94 |

ROY D. FRAZIER, *Primary Examiner.*

J. FRANKLIN FOSS, *Assistant Examiner.*

U.S. Cl. X.R.

211—181